(12) United States Patent
Akahane

(10) Patent No.: US 7,886,081 B2
(45) Date of Patent: Feb. 8, 2011

(54) USB COMMUNICATION SYSTEM, USB DEVICE, AND METHOD OF ERROR DETECTION FOR USB COMMUNICATION SYSTEM

(75) Inventor: Fumihiko Akahane, Nagano (JP)

(73) Assignee: Nidec Sankyo Corporation (JP)

( * ) Notice: Subject to any disclaimer, the term of this patent is extended or adjusted under 35 U.S.C. 154(b) by 479 days.

(21) Appl. No.: 11/844,028

(22) Filed: Aug. 23, 2007

(65) Prior Publication Data

US 2008/0059661 A1 Mar. 6, 2008

(30) Foreign Application Priority Data

Sep. 1, 2006 (JP) .............................. 2006-237277

(51) Int. Cl.
*G06F 3/00* (2006.01)
(52) U.S. Cl. .............................. 710/15; 710/17; 710/18
(58) Field of Classification Search .................... 710/15, 710/17, 18
See application file for complete search history.

(56) References Cited

U.S. PATENT DOCUMENTS

| | | | | |
|---|---|---|---|---|
| 6,012,103 A * | 1/2000 | Sartore et al. | ................... | 710/8 |
| 6,073,193 A * | 6/2000 | Yap | ............................. | 710/100 |
| 6,101,076 A * | 8/2000 | Tsai et al. | ...................... | 361/90 |
| 6,205,502 B1 * | 3/2001 | Endo et al. | ................... | 710/100 |
| 6,279,060 B1 * | 8/2001 | Luke et al. | ..................... | 710/64 |
| 6,415,342 B1 * | 7/2002 | Wahl et al. | ................... | 710/100 |
| 6,647,452 B1 * | 11/2003 | Sonoda | ........................ | 710/305 |
| 6,738,834 B1 * | 5/2004 | Williams et al. | ............... | 710/8 |
| 7,162,555 B2 * | 1/2007 | Kim et al. | ................... | 710/105 |
| 7,260,749 B2 * | 8/2007 | Cox | ............................. | 714/44 |
| 2005/0060447 A1 * | 3/2005 | Tanaka | ........................ | 710/62 |

FOREIGN PATENT DOCUMENTS

JP 2002-244775 8/2002

* cited by examiner

*Primary Examiner*—Chun-Kuan Lee
*Assistant Examiner*—David E Martinez
(74) *Attorney, Agent, or Firm*—Cantor Colburn LLP

(57) ABSTRACT

A USB communication system, a USB device, and a method of error detection for the USB communication system; with which an error of any breaking of physical connection in USB communication can be detected no matter where the breaking happens, and furthermore an error due to logical communication disconnection can also be detected.

In a USB communication system constructed by connecting a host apparatus 2 and a card reader 1 with a USB cable 3, the card reader 1 may include: means for executing a bus reset as a preprocessing for setting a logical connection line with the host apparatus 2, means for measuring a time while the card reader 1 is in a bus reset status, and means for executing an operation of interrupting communication voluntarily according to a measuring result of the means for measuring the time.

12 Claims, 7 Drawing Sheets

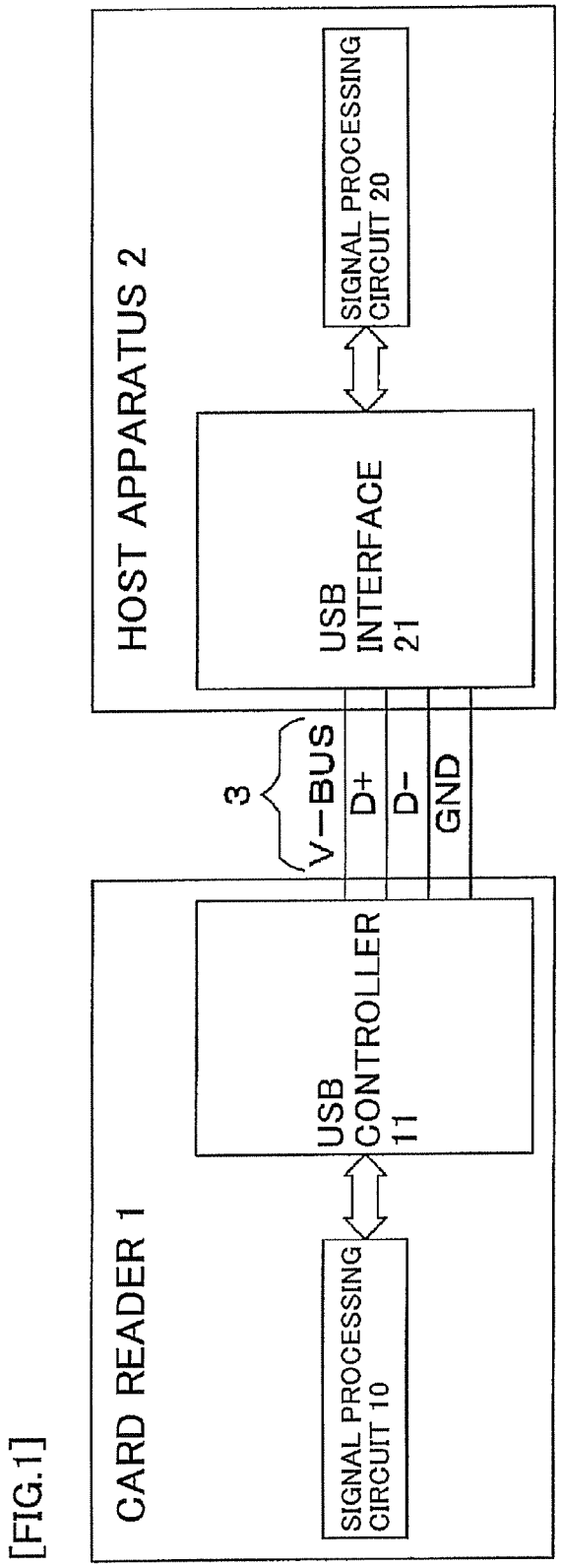

[FIG.2]
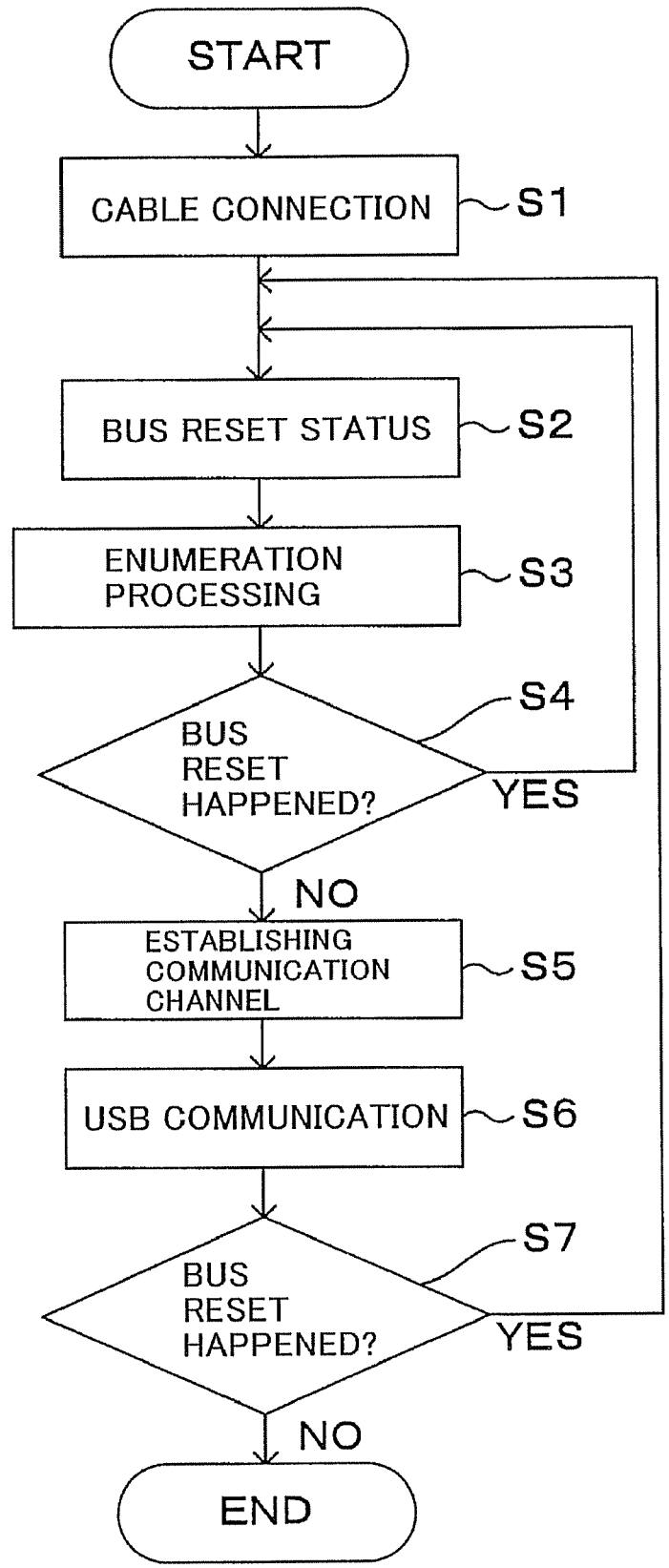

[FIG.3]
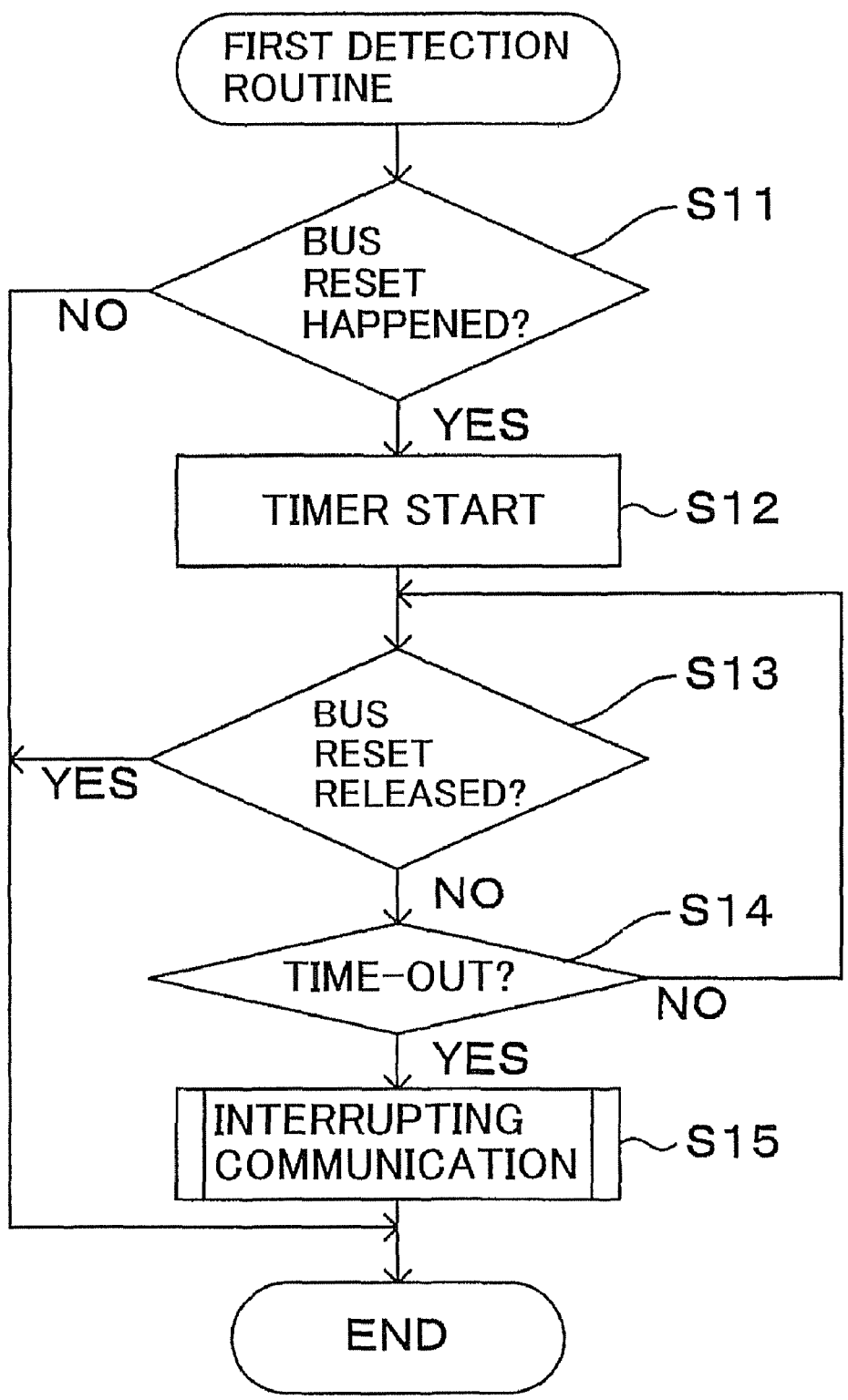

[FIG.4]
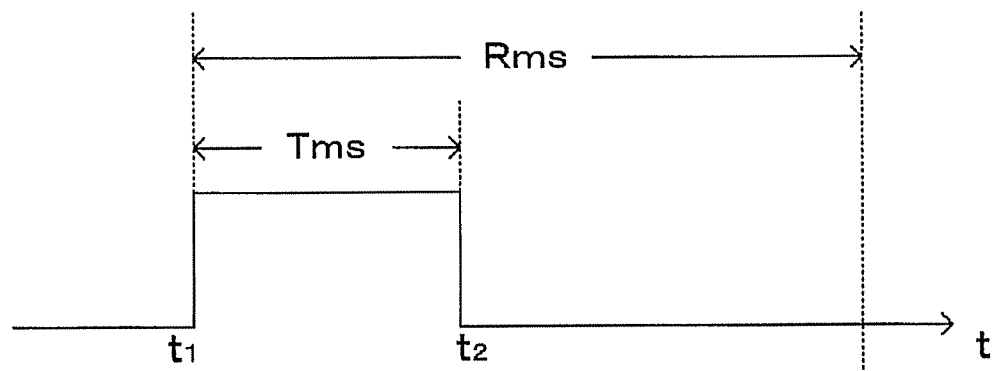
(a)
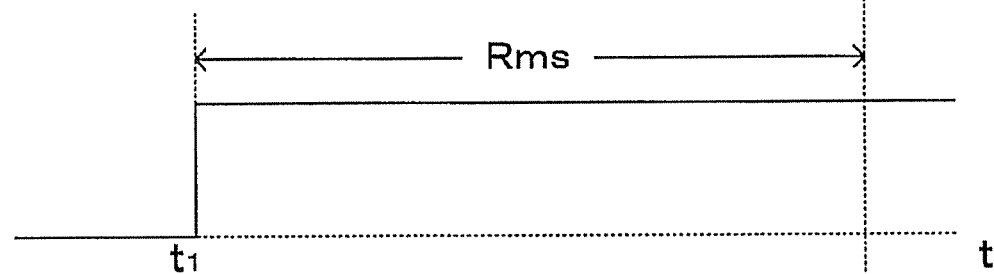
(b)

[FIG.5]
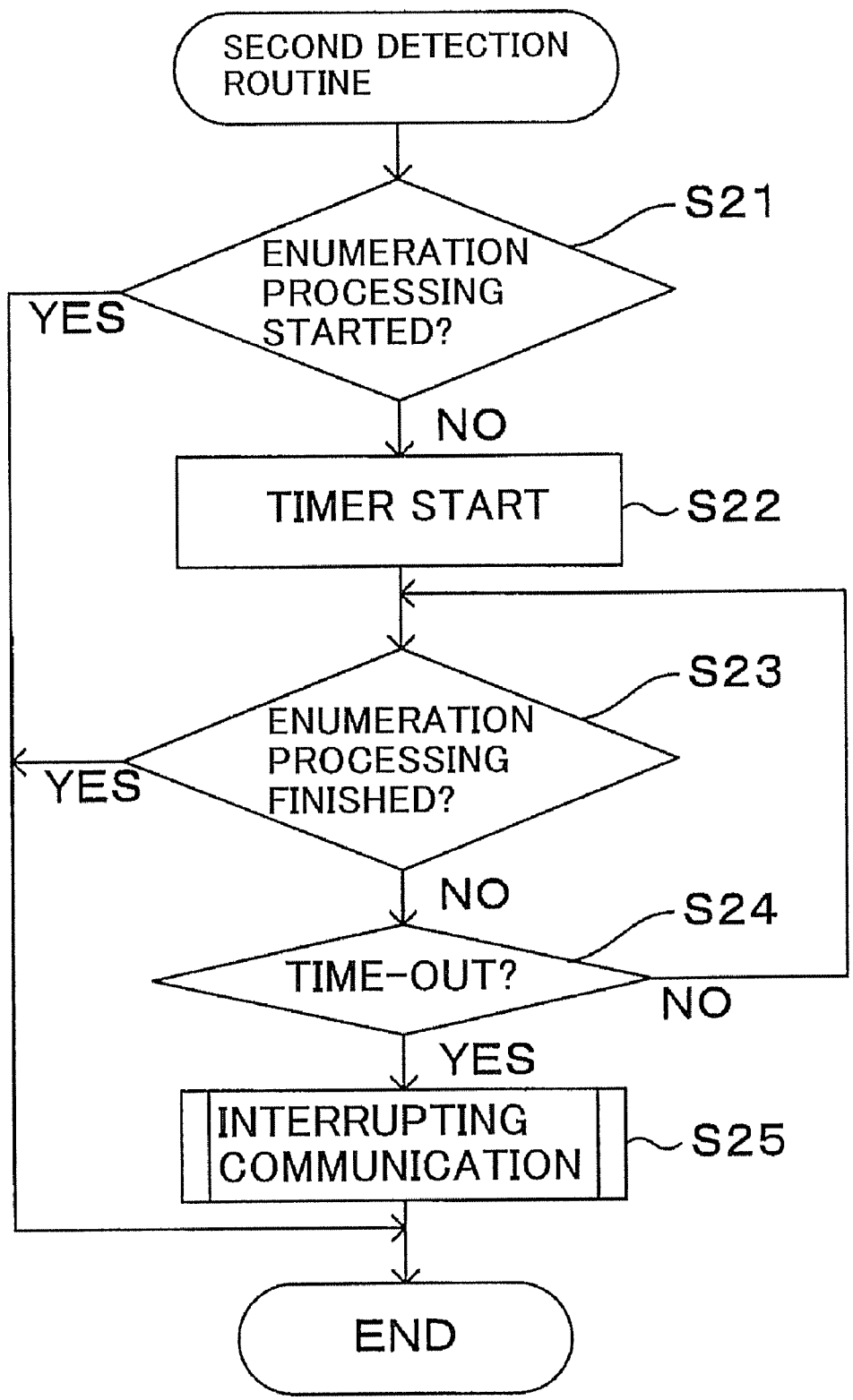

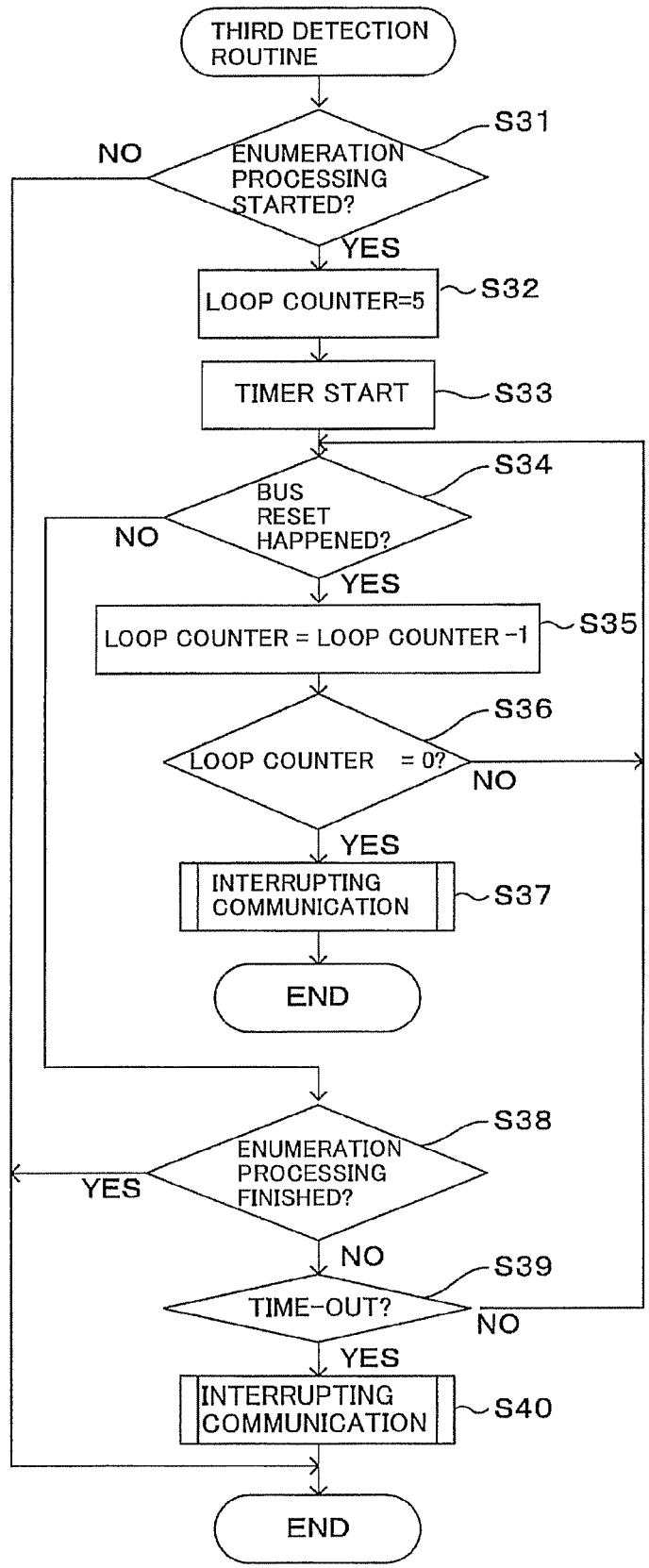

[FIG.7]
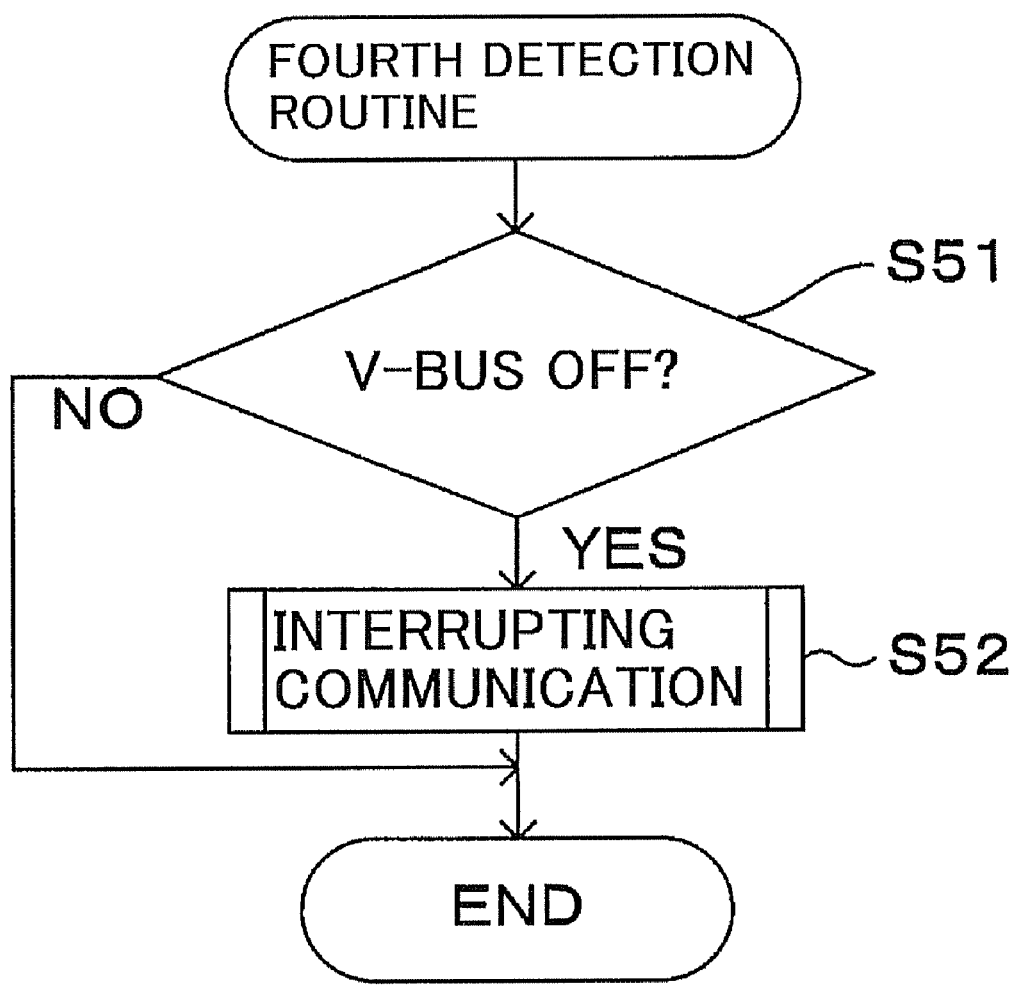

USB COMMUNICATION SYSTEM, USB DEVICE, AND METHOD OF ERROR DETECTION FOR USB COMMUNICATION SYSTEM

This application claims priority under 35 U.S.C. 119 to Japanese application NO. 2006-237277 filed Sep. 1, 2006, which is incorporated herein by reference.

FIELD OF THE INVENTION

The present invention relates to a USB communication system structured by connecting a host apparatus and a USB device with a USB cable, a USB device, and a method of error detection for the USB communication system.

BACKGROUND

Conventionally, there is a system in which a host side computer as a host apparatus and a device are connected through USB (Universal Serial Bus) communication (For example, refer to Patent Document 1). In such a system, the host and the device are connected through serial communication, and the system has various functions for enhancing user-friendliness, such as; a plug-and-play function (an automatic connection recognizing function), a hot insertion function (i.e., a function that enables connecting and disconnecting work under a condition where power supply is on), a power supply function from the host to the device, and so on.

In general, a USB cable to be used for USB communication has 4 wires in total; including a 5V power supply line (a V-BUS line), a GND (ground) line, and a D+ signal line and a D− signal line for data transfer. Then, a V-BUS signal transferred through the V-BUS line is always watched at the device side. That is to say; by always watching a transition condition of the V-BUS signal, it also becomes possible to detect an error of the USB communication. For example, in a system where a host apparatus of a V-BUS line does not intentionally turn off USB communication; if the USB cable gets disconnected due to some reason during USB communication, the V-BUS signal changes from ON condition to OFF condition so that the device recognizes that physical connection of the USB communication is broken and the error of the USB communication can also be detected.

[Patent Document 1]
 Japanese Unexamined Patent Publication (Kokai) No. 2002-244775

SUMMARY

Although the method of error detection for USB communication described above makes it possible to recognize a breaking of physical connection in a case where the USB cable gets disconnected (in a case of USB cable disconnection), however it is difficult for the method to detect logical communication disconnection due to a noise (for example, a switching noise and so on), a software-wise runaway of a computer at the host side (for example, having a condition with a blue screen), and so forth. That is because; sometimes the V-BUS signal does not change from ON condition to OFF condition.

Furthermore, even in a case of a breaking of physical connection in USB communication, sometimes it may be difficult to recognize the breaking. For example, in a case where a hub unit exists between a computer at the host side and a device and then the hub unit operates under self-powered condition (the hub system has its owns built-in power supply); even if a cable is broken between the computer at the host side and the hub unit, sometimes no change appears in a transition condition of the V-BUS signal between the hub unit and the device. That is to say; there is a chance that the method of error detection for USB communication described above does not make it possible to recognize the breaking of physical connection (cable disconnection) in USB communication between the computer at the host side and the hub unit. Namely, it is not necessarily possible to detect an error no matter where the error of cable disconnection happens.

The present invention may be materialized in view of, but is not limited by, the problem described above, and at least an embodiment of the present invention may provide a USB communication system, a USB device, and a method of error detection for the USB communication system; with which an error of any breaking of physical connection in USB communication can be detected no matter where the breaking happens, and furthermore an error due to logical communication disconnection can also be detected.

At least an embodiment the present invention may provides the following means:

A USB communication system, constructed by connecting a host apparatus and a USB device with a USB cable, including: a means for detecting a bus reset generated in the USB device at the time when a logical connection status is reset with the host apparatus; a means for measuring a time from bus reset assertion to bus reset deassertion; and a means for executing an operation of interrupting communication voluntarily according to a measuring result of the means for measuring a time.

According to at least an embodiment the present invention; in a USB communication system equipped with a host apparatus and a USB device includes: a means for detecting a bus reset generated in the USB device at the time when a logical connection status is reset with the host apparatus; a means for measuring a time from bus reset assertion to bus reset deassertion; and a means for executing an operation of interrupting communication voluntarily (even if no command is received from the host apparatus) according to the measured time (for example, if the measured time exceeds a predefined time). Therefore, no matter where a breaking of physical connection of USB communication happens, it is possible to detect such an error.

That is to say; if a communication error happens in a USB device, usually a bus reset comes up each time. If the time of the bus reset continues for a long time, it is assumed that some error has happened and consequently an operation of interrupting communication is voluntarily executed without a command from a host apparatus. Therefore, even in a case of an error where a cable is broken between a computer at a host side and a hub unit, the communication error can be detected. Consequently, accuracy of error detection is improved so that stability of the system can be enhanced.

Especially, even if a logical communication disconnection is caused due to a noise, a software-wise runaway of a computer at the host side, and so on, it can be recognized that some error has happened as far as a bus reset status continues for a predefined time or longer. Therefore, it is possible to recognize not only a breaking of physical connection but also logical communication disconnection.

(2) The USB communication system: wherein the USB device may include a means for executing enumeration processing for setting a status of logical connection from the host apparatus; and furthermore, the means for measuring a time measures a processing time in which the enumeration processing is executed.

The USB device described above may include a means for executing enumeration processing for setting a status of logical connection from the host apparatus; and a processing time, in which the enumeration processing is executed, is measured. Therefore, even in case where some communication error happens during the enumeration processing, the communication error can be detected so that accuracy of error detection can further be improved.

(3) The USB communication system: wherein the USB device includes a means for counting the number of happenings of the bus reset while the enumeration processing is executed; and the means for executing an operation of interrupting communication executes an operation of interrupting communication voluntarily according to a measuring result of the means for counting the number of happenings.

According to at least, an embodiment of the present invention, the USB device described above includes a means for counting the number of happenings of the bus reset while the enumeration processing is executed; and an operation of interrupting communication is executed voluntarily according to a measuring result of the means for counting the number of happenings (for example, if the measuring result exceeds a predefined number). Therefore, a double-check can be carried out for an error detection in terms of time as well as another error detection in terms of the number of operations, so that error detection with higher accuracy can be materialized.

(4) The USB communication system: wherein the USB device may include a means for recognizing a voltage level of a power supply line in the USB cable; and the means for executing an operation of interrupting communication executes an operation of interrupting communication voluntarily according to a recognition result of the means for recognizing a voltage level.

According to at least an embodiment the present invention, the USB device described above includes a means for recognizing a voltage level of a power supply line (for example, a V-BUS line) in the USB cable; and an operation of interrupting communication is executed voluntarily according to the recognition result. Therefore, in addition to an error detection in terms of time and/or another error detection in terms of the number of operations, an error detection in terms of a change status of a V-BUS signal can be carried out so that accuracy of error detection can further be improved.

(5) The USB communication system: wherein the USB device is a card medium processing apparatus for executing a certain processing on a card medium; the card medium processing apparatus includes a controlling means for mechanically controlling of internal reception and external ejection of a card medium; and the controlling means externally ejects a card medium remaining internally as a result of execution of operation of the interrupting communication.

According to at least an embodiment of the present invention, adopted as the USB device described above is a card medium processing apparatus for executing a certain processing on a card medium, and the card medium processing apparatus includes a controlling means (for example, a drive motor, a transfer roller, a shutter, and so on) for mechanically controlling of internal reception and external ejection of a card medium. Then, at the time of execution of operation of the interrupting communication, the controlling means externally ejects a card medium remaining internally. Therefore, even when a logical communication disconnection happens, an operation of returning a card to a user for example can be carried out according to a judgment by the card medium processing apparatus itself. Accordingly, even in a case of an ATM unit for example, to which no supervisory operator attends, it is possible to prevent a card of a user from disabled ejection out of the card medium processing apparatus so that convenience performance of card operation can be improved.

(6) The USB communication system: wherein the USB device is a card medium processing apparatus for executing a certain processing on a card medium; the card medium processing apparatus includes a controlling means for mechanically controlling of internal reception and external ejection of a card medium; and the controlling means blocks further card medium reception as a result of execution of operation of the interrupting communication.

According to at least an embodiment the present invention, adopted as the USB device described above is a card medium processing apparatus for executing a certain processing on a card medium, and the card medium processing apparatus includes a controlling means (for example, a drive motor, a transfer roller, a shutter, and so on) for mechanically controlling of internal reception and external ejection of a card medium. Then, at the time of execution of operation of the interrupting communication, the controlling means blocks further card medium reception. Therefore, when a logical communication disconnection happens, an operation of blocking card reception for example can be carried out according to a judgment by the card medium processing apparatus itself. Accordingly, in a case of an ATM unit for example, to which no supervisory operator attends, it is possible to prevent an unfavorable situation through which the card medium processing apparatus may be damaged, for example, by forcible card insertion and so on so that security performance of card operation can be improved.

(7) The USB communication system may comprise: the USB device is a card medium processing apparatus for executing a certain processing on a card medium; the card medium processing apparatus includes a controlling means for mechanically controlling of internal reception and external ejection of a card medium; and the controlling means locks and holds a card medium remaining internally as a result of execution of operation of the interrupting communication.

According to at least an embodiment the present invention, adopted as the USB device described above is a card medium processing apparatus for executing a certain processing on a card medium, and the card medium processing apparatus includes a controlling means (for example, a drive motor, a transfer roller, a shutter, and so on) for mechanically controlling of internal reception and external ejection of a card medium. Then, at the time execution of operation of the interrupting communication, the controlling means locks and holds a card medium remaining internally. Therefore, when a logical communication disconnection happens, an operation of blocking card ejection can be carried out according to a judgment by the card medium processing apparatus itself. Accordingly, in a case of an ATM unit for example, to which no supervisory operator attends, it is possible to prevent an unfavorable situation through which the card medium processing apparatus may be damaged, for example, by forcible draw back of a card remaining internally and so on so that security performance of card operation can be improved. Furthermore, since the card medium is kept remaining internally until a supervisory operator, who has become aware of the error, arrives at a location of the card medium processing apparatus, it is possible to prevent cause analysis of the error detection from becoming difficult.

(8) A USB device may be used in the USB communication system according to any of the above items (1) through (7) is envisioned and disclosed hereby also.

According to at least an embodiment the present invention, it is possible to provide a USB device which can be used in the USB communication system described above, and with which it is possible to detect an error owing to logical communication disconnection.

(9) A method of error detection for a USB communication system, constructed by connecting a host apparatus and a USB device with a USB cable, including: a first step of detecting a bus reset generated in the USB device at the time when a logical connection status is reset with the host apparatus; a second step of measuring a time from bus reset assertion to bus reset deassertion; and a third step of executing an operation of interrupting communication voluntarily according to a measuring result of the second step.

According to at least an embodiment of the present invention, the method of error detection for a USB communication system may include: a step of detecting a bus reset generated in the USB device at the time when a logical connection status is reset with the host apparatus (i.e., a step of detecting a bus reset from the host apparatus to receive logical connection again); another step of measuring a time from bus reset assertion to bus reset deassertion; and still another step of executing an operation of interrupting communication voluntarily according to a measuring result of the above measuring operation. Therefore, an error of any breaking of physical connection in USB communication can be detected no matter where the breaking happens, and furthermore an error due to logical communication disconnection can also be detected.

(10) The method of error detection for a USB communication system including: a fourth step of executing enumeration processing in the USB device for setting a status of logical connection with the host apparatus after execution of the first step; a fifth step of measuring a processing time in which the enumeration processing is executed; and a sixth step of executing an operation of interrupting communication voluntarily according to a measuring result of the fifth step.

According to at least an embodiment the present invention, the method of error detection for a USB communication system may include: a step of executing enumeration processing for setting a status of logical connection with the host apparatus; another step of measuring a processing time in which the enumeration processing is executed; and still another step of executing an operation of interrupting communication voluntarily according to a measuring result of the above measuring operation. Therefore, in the same manner as described above, even though some communication error happens during enumeration processing, the communication error can be detected.

(11) The method of error detection for a USB communication system including: a seventh step of counting the number of happenings of the bus reset in the USB device while the enumeration processing is executed; and an eighth step of executing an operation of interrupting communication voluntarily according to a measuring result of the seventh step.

According to at least an embodiment the present invention, the method of error detection for a USB communication system may include: a step of counting the number of happenings of the bus reset in the USB device while the enumeration processing is executed; and another step of executing an operation of interrupting communication voluntarily according to a measuring result of the above measuring operation. Therefore, a double-check can be carried out for an error detection in terms of time as well as another error detection in terms of the number of operations.

(12) The method of error detection for a USB communication system including: a ninth step of recognizing a voltage level of a power supply line in the USB cable in the USB device; and a tenth step of executing an operation of interrupting communication voluntarily according to a recognition result of the ninth step.

According to at least an embodiment of the present invention, the method of error detection for a USB communication system includes: a step of recognizing a voltage level of a power supply line (for example, a V-BUS line) in the USB cable; and another step of executing an operation of interrupting communication voluntarily according to a result of the recognition. Therefore, in addition to an error detection in terms of time and/or another error detection in terms of the number of operations, an error detection in terms of a change status of a V-BUS signal can be carried out.

As described above, according to a USB communication system, a USB device, and a method of error detection for the USB communication system relating to the present invention; no matter where a breaking of physical connection happens and even in a case where logical communication disconnection happens, it is still possible to detect such a disconnection as an error so that stability of the system can be upgraded.

BRIEF DESCRIPTION OF THE FIGURES

Embodiments will now be described, by way of example only, with reference to the accompanying drawings which are meant to be exemplary, not limiting, and wherein like elements are numbered alike in several Figures, in which:

FIG. 1 is a drawing of a system structure of a USB communication system relating to an embodiment of the present invention.

FIG. 2 is a flowchart describing a flow of USB communication in the USB communication system shown in FIG. 1.

FIG. 3 is a flowchart describing an example of a method of error detection (a first detection routine) for a USB communication system relating to an embodiment of the present invention.

FIG. 4 is an explanatory drawing to describe an operation of detecting a bus reset by the card reader in the first detection routine shown in FIG. 3.

FIG. 5 is a flowchart describing another example of a method of error detection (a second detection routine) for a USB communication system relating to an embodiment of the present invention.

FIG. 6 is a flowchart describing another example of a method of error detection (a third detection routine) for a USB communication system relating to an embodiment of the present invention.

FIG. 7 is a flowchart describing another example of a method of error detection (a fourth detection routine) for a USB communication system relating to an embodiment of the present invention.

DESCRIPTION OF THE PREFERRED EMBODIMENTS

A preferred embodiment of the present invention is described below with reference to the accompanying drawings.

(System Structure)

FIG. 1 is a drawing of a system structure of a USB communication system relating to an embodiment of the present invention. Incidentally, in FIG. 1, a card reader 1 is adopted as a USB device and a host apparatus 2 such as an ATM (automated telling machine) is adopted as a computer at a host side. However, the present invention is not limited to this arrangement. For example; a mouse, a keyboard, a scanner, a printer, a USB memory, and so on can be named as a USB device; and meanwhile a home-use PC, a game machine, and so forth can be named as a computer at a host side. Furthermore, though one and only USB device (the card reader 1) is connected to the host apparatus 2 in FIG. 1, practically 127 USB devices at the maximum including the card reader 1 can be connected (the number of addresses that can be assigned to the USB devices is 127 at the maximum).

In FIG. 1, the card reader 1 is connected to the host apparatus 2 through a USB cable 3. The USB cable 3 has 4 wires in total; including a 5V power supply line (a V-BUS line), a GND (ground) line, and a D+ signal line and a D− signal line for data transfer.

Primarily, the card reader 1 is equipped with a signal processing circuit 10 including; a CPU for commanding and controlling a whole part of the card reader 1, a ROM for storing various programs such as control programs, etc., a RAM that functions as a working area for the CPU, an EEPROM for saving various setup data, and so on; as well as a USB controller 11 including; a controller IC for controlling communication with the host apparatus 2 (for example, made up with an IC circuit which is built in the card reader 1), a register (i.e., a FIFO buffer to work as an end point) for setting (and/or resetting) a logical connection status (so-called "a pipe"), and so on.

The card reader 1 shown in FIG. 1 is a USB device that does not drive by using 5V power supply of the V-BUS signal but has its own power supply built in as a self-powered type device. However, in a case where a bus-powered type small device such as a USB memory is adopted as a USB device, it is also possible to drive by using 5V power supply of the V-BUS signal.

Between the signal processing circuit 10 and the USB controller 11, an address number is transferred through an address bus and data is transferred through a data bus. For example, a register inside the USB controller 11 is assigned to each address, and the CPU of the signal processing circuit 10 specifies a register address at discretion. Then, the controller IC of the USB controller 11 transfers data corresponding to the specified address to the signal processing circuit 10. Thus, the CPU of the signal processing circuit 10 carries out data referencing operation. Meanwhile, the CPU of the signal processing circuit 10 is also able to send data, which the host apparatus 2 requests, to the host apparatus 2 through the USB controller 11.

Primarily, the host apparatus 2 is equipped with a signal processing circuit 20 including; a CPU for commanding and controlling a whole part of the host apparatus 2, a ROM for storing various programs such as control programs, etc., a RAM that functions as a working area for the CPU, and so on; as well as a USB interface 21 including a buffer for setting a logical connection status (so-called "a pipe" or "a communication line"), and so on. Incidentally, it is also possible to replace the CPU and the buffer of the USB interface 21 with the CPU and the memory (the RAM, the EEPROM, and so on) of the signal processing circuit 20.

Then, in the USB communication system shown in FIG. 1, the controller IC of the USB controller 11 is provided with a function for detecting a bus reset as a preprocessing for setting (and/or resetting) a logical connection status with the host apparatus 2, a function for measuring a time from bus reset assertion to bus reset deassertion on the USB line, and a function for execution of interrupting communication voluntarily according to a result of the above measuring. Furthermore, the controller IC also has various other functions, which are described later. Moreover, although the controller IC bears these functions in the present embodiment, any other electrical device may bear these functions as far as the device is one of the electrical devices existing in the card reader 1, for example the CPU of the signal processing circuit 10 and so on.

(Flow of USB Communication)

FIG. 2 is a flowchart describing a flow of USB communication in the USB communication system shown in FIG. 1.

In FIG. 2, connecting a cable is carried out at first (Step S1). Practically to describe, the card reader 1 is physically and electrically connected to the host apparatus 2 through the USB cable 3. Incidentally, in FIG. 1, the host apparatus 2 works as a master unit while the card reader 1 works as a slave unit to carry out USB communication according to a polling (reference) from the host apparatus 2. Furthermore, the host apparatus 2 controls all of USB communication and the card reader 1 as a slave unit cannot start USB communication arbitrarily.

Next, detected in the card reader 1 is a bus reset (bus reset status) for initializing USB communication with the host apparatus 2 (for initializing the bus). More concretely to describe, the signal processing circuit 20 of the host apparatus 2 sends a reset signal through the USB interface 21 by getting, for example, both the signal lines of "D+" and "D−" to have a low level, or in an equivalent manner. Then, the controller IC of the USB controller 11, which receives the reset signal, detects the bus reset (bus reset status) (Step S2).

By the way, details of the bus reset (bus reset status) are described later with reference to FIG. 4. Furthermore, for example, either the USB controller 11 or the signal processing circuit 10 may carry out an internal reset. Moreover, in the present embodiment, it does not matter what type of signal is applied to the reset signal described above that works as a cue for the internal reset. For example, instead of getting both the signal lines of "D+" and "D−" to have a low level, what is applied may be a signal that temporarily stops the D+ signal line being pulled up under normal condition. Furthermore, in the card reader 1 of the present embodiment, a bus reset is detected at various points of timing even without receiving any, reset signal from the host apparatus 2. For example, a bus reset (bus reset assertion) is detected, also when a malfunction happens during enumeration processing or USB communication described later.

After the bus reset status of Step S2 is normally released (namely, after the bus reset deassertion is detected), a default pipe (a logical connection status) is set between the USB controller 11 of the card reader 1 and the USB interface 21 of the host apparatus 2. Then, by a control transfer using the default pipe, enumeration processing (enumeration processing) to be explained next is carried out (Step S3).

Enumeration processing shown in Step S3 means an initial procedure for connection between the card reader 1 and the host apparatus 2; and in the enumeration processing, various operations are carried out in order to establish a communication channel on an application level. For example, the signal processing circuit 20 of the host apparatus 2 requests a transfer of information of a device descriptor that is stored in the card reader 1. Then, the signal processing circuit 20 of the host apparatus 2 sends the card reader 1 a command of setting up for an unused address. Thus, in view from the host apparatus 2, the card reader 1 has acquired a certain device address so that the card reader 1 and the host apparatus 2 are able to communicate each other afterward by using the device address. Furthermore, information on resources of the card reader 1 (operating condition of a device, specification and the number of pipes, an ID code, etc.) is transferred from the card reader 1 to the host apparatus 2.

As described above, after various kinds of information is sent from the card reader 1 to the host apparatus 2; as far as no bus reset happens during the enumeration processing ("NO" at Step S4), a communication channel on an application level is established (Step S5). The communication channel includes a plurality of pipes (logical connection status), and the plurality of pipes (for example, two pipes in case of low speed communication and 15 pipes in case of high speed communication) logically connect a register of the USB controller 11 and a buffer of the USB interface 21. As shown in Step S2 and S3, a bus reset is detected as a preprocessing for setting a logical connection status with the host apparatus 2.

Incidentally, in relation to data transmission methods using a plurality of pipes, there are various kinds of methods such as, for example; a bulk transmission method with which a great amount of data can be transmitted in a lump sum, an interrupter transmission method with which a small amount of data can be transmitted at constant regular intervals, an isochronous transmission method with which a data amount within a certain time period is guaranteed, and so on. Though an interrupter transmission method is adopted for the card reader 1 and the host apparatus 2 in the present embodiment, the present invention is not limited to this arrangement and a suitable transmission method for a USB device may be adopted accordingly.

Before a communication channel on an application level is established after completion of enumeration processing (namely, before Step S5), sometimes a bus reset may come up ("YES" at Step S4). More concretely to describe; owing to an external and/or internal cause such as a noise, a software-wise runaway, and so on, a bus reset may be detected in the USB controller 11 of the card reader 1. Furthermore, there may be a case where a breaking of physical connection in USB communication happens somewhere in the USB communication system.

If such condition as described above comes up, the card reader 1 has the bus reset status explained for Step S2 again and then carries out again the enumeration processing of Step S3. On the other hand; if such condition does not come up ("NO" at Step S4), a communication channel is established as described above (Step S5).

Next, USB communication on an application level is carried out (Step S6). Concretely to describe, the signal processing circuit 10 of the card reader 1 stands by until receiving a command from the host apparatus 2. When having received a prescribed command (for example, reading electromagnetic data recorded in a card) via the USB controller 11, the signal processing circuit 10 sends prescribed data (for example, money-related data) to the host apparatus 2 according to the contents of the command.

On this occasion, sometimes a bus reset may happen during USB communication ("YES" at Step S7). More concretely to describe; owing to an external and/or internal cause such as a noise, a software-wise runaway, and so on, an internal reset may be carried out in the USB controller 11 of the card reader 1. Furthermore, in the same manner as described above, there may be a case where a breaking of physical connection in USB communication happens somewhere in the USB communication system.

If such condition as described above comes up, the card reader 1 has the bus reset status (Step S2) explained for Step S2 again and then carries out again the enumeration processing of Step S3 (Step S3 and Step S5) and also USB communication (Step S6) again. On the other hand; if such condition does not come up ("NO" at Step S7), USB communication ends.

(Method of Error Detection for USB Communication System)

FIG. 3 is a flowchart describing an example of a method of error detection (a first detection routine) for a USB communication system relating to an embodiment of the present invention. Incidentally, in the present embodiment; a control program, data of variables, and so on for implementation of the flowchart shown in FIG. 3 are stored in the controller IC of the USB controller 11. However, it does not matter where the above is stored. For example, the above may be stored inside the signal processing circuit 10.

Furthermore, in the present embodiment, the controller IC of the USB controller 11 is provided with a timer function as described above so as to become able to measure a time, as required. Concretely to describe, the controller IC is able to measure a time from detecting bus reset assertion by the card reader 1 to detecting bus reset deassertion by the card reader 1. By the way, the timer function, with which the controller IC is provided, may also be born by the CPU of the signal processing circuit 10. Moreover, it is also possible to additionally provide the card reader 1 with a timer circuit (a counter circuit) such as an SR time flip-flop (FF), a clock oscillator, a clock gate circuit, and so on.

In FIG. 3, it is judged at first whether or not a bus reset has happened (whether or not a bus reset assertion has been detected) (Step S11). Furthermore, it is judged by the USB controller 11 whether or not a bus reset has happened during enumeration processing and USB communication. If no bus reset has happened ("NO" at Step S11), the first detection routine ends.

On the other hand; if a bus reset has happened ("YES" at Step S11), a timer of the controller IC starts (Step S12). Subsequently, it is judged by the controller IC whether or not the bus reset of the card reader 1 has been released (whether or not a bus reset deassertion has been detected) (Step S13). If the bus reset is already released, the first detection routine ends ("YES" at Step S13).

On the other hand; if the bus reset is not released ("NO" at Step S13) and a prescribed time (for example, from several tens of milliseconds to several hundreds milliseconds) passes ("YES" at Step S14), the controller IC judges the condition to be time-out (Namely, time is up) and executes operation of interrupting communication (Step S15). Thus, operations of Step S12 to Step S14 make up a step for measuring a time during which the card reader 1 is in the bus reset status. Furthermore, an operation shown as Step S15 is a step for execution of interrupting communication voluntarily according to a measuring result of Step S 12 to Step S14.

On this occasion, named as practical examples of operation of interrupting communication shown as Step S15 can be operations; such as, returning a card inserted into the card reader 1 to a user automatically (forcible ejection), blocking further reception of a card, and capturing a card inserted into the card reader 1 (by locking) while disabling an arbitrary draw back of the card (holding), and so on until service personnel arrives at. More concretely to explain; the card reader 1 is equipped with a drive motor, a transfer roller, a transfer path, a shutter (a solenoid), and son on for mechanically controlling acquisition of a card into an internal section of the card reader 1 and ejection of the card externally, though the components described above are not illustrated in FIG. 1. Therefore, if once the USB controller 11 executes operation of interrupting communication, a course of the operation is transmitted as a request for interrupting communication to the signal processing circuit 10. Then, the CPU of the signal processing circuit 10 sends various control signals to each corresponding section. For example, in order to eject the card forcibly, the CPU sends a drive control signal to the drive motor, and then the transfer roller connected to the drive motor by using a pulley, a belt, etc. turns so that the card remaining in the card reader 1 is ejected externally (forcible ejection). Furthermore, for example, in order to block further reception of a card, the CPU sends a drive control signal to the shutter, and then the shutter blocks off the transfer path so that further reception of a card is disabled. Still further, for example, in order to lock and hold the card remaining in the card reader 1, the CPU sends a drive control signal to the shutter, and then the shutter blocks off the card outlet port so that a draw back of the card remaining in the card reader 1 is disabled.

FIG. 4 is an explanatory drawing to describe an operation of detecting a bus reset by the card reader 1 in the first detection routine shown in FIG. 3.

Assumed at first is a case, as shown in FIG. 4A, in which there exists no error owing to an external and/or internal cause such as a noise, a software-wise runaway, and so on, and bus reset status is maintained only for a predefined time, "Tms". In this case, a built-in timer starts at the time of "t1" (i.e., at the time of assertion) in the controller IC of the USB controller 11 (Step S12 in FIG. 3) in order to commence measuring time. Then, at the time of "t2" (i.e., at the time of deassertion) before spending a predefined restriction time "Rms", the bus reset is released ("YES" at Step S13 in FIG. 3). Therefore, the first detection routine ends without execution of interrupting communication (Step S15 in FIG. 3).

On the other hand, assumed next is a case, as shown in FIG. 4B, in which there exists an error owing to an external and/or internal cause such as a noise, a software-wise runaway, and so on, and bus reset status is still maintained even after the restriction time "Rms" has passed. In this case, a built-in timer starts at the time of "t1" (i.e., at the time of assertion) in the controller IC of the USB controller 11 (Step S12 in FIG. 3) in order to commence measuring time. Then, even at the time of "t1+Rms" when the predefined restriction time "Rms" has passed, the bus reset status is not yet released (deassertion is not yet implemented) ("NO" at Step S13 and "YES" at Step S14 in FIG. 3). Therefore, operation of interrupting communication (Step S15 in FIG. 3) is executed.

FIG. 5 is a flowchart describing another example of a method of error detection (a second detection routine) for a USB communication system relating to an embodiment of the present invention. Incidentally, in the same manner as for the case described in FIG. 3, a control program, data of variables, and so on for implementation of the flowchart shown in FIG. 5 are stored in the controller IC, etc., of the USB controller 11. Furthermore, the controller IC is provided with a timer function as well as a function of measuring the processing time during which enumeration processing is carried out.

In FIG. 5, it is judged at first whether or not enumeration processing has started (Step S21). More concretely to describe; after the bus reset is normally released (Step S2 in FIG. 1), the controller IC of the USB controller 11 starts an initial procedure for connection between the card reader 1 and the host apparatus 2 in order to establish a communication channel on an application level (to make up logical connection status between the card reader 1 and the host apparatus 2).

At the time, coinciding with the start of the initial procedure for connection, a timer inside the controller IC starts (Step S22). Afterward, the controller IC judges whether or not the enumeration processing has finished, that is to say, whether or not the communication channel on an application level has been established (Step S23). If the enumeration processing is finished ("YES" at Step S23), the second detection routine ends.

On the other hand; if the enumeration processing is not yet finished ("NO" at Step S23) and a prescribed time passes ("YES" at Step S24), the controller IC judges the condition to be time-out (Namely, time is up) and executes operation of interrupting communication (Step S25). Thus, operations of Step S22 to Step S24 make up a step for measuring a processing time of execution of the enumeration processing, and a step for execution of interrupting communication voluntarily according to the measuring result. By the way, the operation of interrupting communication of Step S25 is as described above.

Usually, the initial procedure for connection (the enumeration processing) progresses and completes in a very short time. However, it is known that; if an external noise is imposed and/or the USB cable 3 is connected incompletely, the progress of the initial procedure for connection encounters great hindrance. Furthermore, if each operation of the enumeration processing (dealing) does not complete normally owing to driver specifications of the host side (a side of the host apparatus 2), a retrying operation may be added, or sometimes the dealing operation may be carried out again, depending on the case, from its beginning. It is known, however, if a certain number of retrying operations do not result in a normal completion, the procedure is eventually given up. Then, such condition may also come up not only at the time of start-up operation of the USB device and the host, but also at the time of change from physically disconnected condition to connected condition of the cable as well as the time of recovery from an error owing to an external and/or internal cause (that is to say; sometimes normally connected condition may change to disconnected condition). Therefore, according to the second detection routine shown in FIG. 5 described above, even in a case of disconnected condition caused in such a manner as described above, the condition can be detected as a case of an error happened.

FIG. 6 is a flowchart describing another example of a method of error detection (a third detection routine) for a USB communication system relating to an embodiment of the present invention. Concretely to describe, it is a flowchart in which a double-check is carried out for implementation of an error detection in terms of time as well as another error detection in terms of the number of operations. That is to say; the flowchart of FIG. 6 includes the flowchart of FIG. 5, and carried out in the flowchart of FIG. 6 are the error detection in terms of time (Refer to FIG. 5) and the error detection in terms of the number of operations (Refer to FIG. 6). Operation of interrupting communication is executed (Step S36 and Step S40) when either condition is met.

Incidentally, in the same manner as for the cases described in FIG. 3 and FIG. 5, a control program, data of variables, and so on for implementation of the flowchart shown in FIG. 6 are stored in the controller IC, etc., of the USB controller 11. Furthermore, the controller IC is provided with a timer function as well as a function of counting the number of operations of bus reset caused while enumeration processing is carried out.

In FIG. 6, it is judged at first whether or not enumeration processing has started (Step S31). If no enumeration processing has started ("NO" at Step S31), the third detection routine ends. On the other hand, if enumeration processing has already started ("YES" at Step S31), "5" is entered into a loop counter (variable) (Step S32) and furthermore a timer, for which a time limit value is set to be 10 seconds for example, gets started (Step S33).

Next, the controller IC of the USB controller 11 judges whether or not a bus reset has happened (Step S34). If no bus reset has happened ("NO" at Step S34), the same operations as Step S23 to Step S25 described above for the second detection routine (Refer to FIG. 5) are carried out in due order (Step S38 to Step S40). Details of the second detection routine are as described above. If, at Step 39, the timer set with a time limit value to be 10 seconds for example has a time-out ("NO" at Step S39), operation returns to Step S34.

On the other hand, if a bus reset has happened while enumeration processing is carried out ("YES" at Step S34), a loop counter value decreases for 1 (Step S35). Subsequently, the controller IC judges whether or not the loop counter value is equal to 0 (Step S36). If the loop counter value is equal to 0 ("YES" at Step S36), operation of interrupting communication described above is executed (Step S37). If the loop counter value is not equal to 0 ("NO" at Step S36), operation returns to Step S34. Thus, the operations including Step S36 and so on make up a step for counting the number of operations of bus reset caused while enumeration processing is carried out. Furthermore, operation of Step S37 makes up a step for execution of interrupting communication voluntarily according to the number of operations of bus reset caused.

FIG. 7 is a flowchart describing another example of a method of error detection (a fourth detection routine) for a USB communication system relating to an embodiment of the present invention. Incidentally, in the same manner as for the cases described in FIG. 3, FIG. 5, and FIG. 6, a control program, data of variables, and so on for implementation of the flowchart shown in FIG. 7 are stored in the controller IC, etc., of the USB controller 11. Furthermore, the controller IC is provided with a function of recognizing a voltage level (V-BUS) of a power supply line in the USB cable 3 as well as a function of executing an operation of interrupting communication voluntarily according to a result of the recognition.

In FIG. 7, the controller IC of the USB controller 11 judges whether or not the V-BUS signal has changed from ON condition to OFF condition (Step S51). If the V-BUS signal is already changed to OFF condition, operation of interrupting communication is executed (Step S52). If the V-BUS signal is not changed to OFF condition, the fourth detection routine ends. Thus, the operations described as Step S51 and Step S52 make up a step for recognizing the voltage level of the power supply line in the USB cable 3 and another step for executing an operation of interrupting communication voluntarily according to a result of the recognition.

(Advantageous Effect of the Embodiment)

As described above, according to the methods of error detection for the USB communication system relating to the present embodiment; by using various detection routines such as, whether or not bus reset status has lasted for a predefined time or longer (the first detection routine shown in FIG. 3), whether or not enumeration processing has not yet finished even after spending a predefined time (the second detection routine shown in FIG. 5), whether or not bus reset status has come up for the predefined number of operations during enumeration processing (the third detection routine shown in FIG. 6), logical communication disconnection can be recognized even if the logical communication disconnection is caused due to a noise, a software-wise runaway of a computer at the host side, and so on. Consequently, accuracy of error detection is improved so that stability of the system can be enhanced. Furthermore, no matter where a breaking of physical connection happens in USB communication, the error can be detected and, from the viewpoint of the error detection performance described above, accuracy of error detection can still be improved.

Furthermore, by adding the fourth detection routine for judging whether or not the V-BUS signal has changed from ON condition to OFF condition, to the first detection routine, the second detection routine, and the third detection routine; accuracy of error detection can still further be improved. By the way, though each of the first to third routines is explained individually in the present embodiment, it is possible as a matter of course to combine these routines. Combining multiple detection routines can generate a synergistic effect, such as further improvement of detection accuracy.

Moreover, as a result of execution of interrupting communication, for example, the card reader 1 can automatically return an inserted card to a user. Thus, even in a case of an ATM unit to which no supervisory operator attends, it is possible to prevent a card of a user from being stocked inside the card reader 1 so that convenience performance of card operation can be improved. Furthermore, as a result of execution of interrupting communication, for example, further reception of a card can be stopped. Thus, it is possible to avoid such a situation where, even though an error has already happened in the card reader 1, a next further card is inserted so that the card reader 1 may get broken down. Through the operation described above, consequently security performance of card operation can be improved. Still further, as a result of execution of interrupting communication, for example, a card remaining in the card reader 1 can be locked and held. Thus, it is possible to avoid such a situation where the card remaining in the card reader 1 is drawn back forcibly so that the card reader 1 may get broken down. Through the operation described above, consequently security performance of card operation can be improved.

Incidentally, in the USB communication system of the card reader 1 and the host apparatus 2 described above; if a line gets broken during data transmission (in dealing operation) between the above two units, it becomes impossible to send a command from the host apparatus 2 to the card reader 1. Therefore, it is necessary for the card reader 1 to detect such a situation and start operation by itself as required (for example, in a case where a user has already inserted a card into the system and operation has started, and so on). Therefore, it is indispensable to detect such a breaking of communication.

INDUSTRIAL APPLICABILITY

As described above, the present invention may be useful for making it possible to recognize logical communication disconnection due to a noise, a software-wise runaway of a computer at a host side, and so forth.

REFERENCE NUMERALS

1. Card reader
2. Host apparatus
3. USB cable
10. Signal processing circuit
11. USB controller
20. Signal processing circuit
21. USB interface While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A USB communication system, constructed by connecting a host apparatus and a USB device with a USB cable, wherein the USB device is a card medium processing apparatus for executing a certain processing on a card medium, USB communication system comprising:
   a means for detecting a bus reset generated in the USB device at the time when a logical connection status is reset with the host apparatus;
   a means for measuring a time from bus reset assertion to bus reset deassertion; and
   a means for executing an operation of interrupting communication voluntarily according to a measuring result of the means for measuring a time;
   wherein the means for executing an operation of interrupting communication voluntarily comprises a controlling means for mechanically controlling of internal reception and external ejection of the card medium.

2. The USB communication system according to claim 1:
   wherein the USB device includes a means for executing enumeration processing for setting a status of logical connection from the host apparatus; and
   furthermore, the means for measuring a time measures a processing time in which the enumeration processing is executed.

3. The USB communication system according to claim 2:
   wherein the USB device includes a means for counting the number of happenings of the bus reset while the enumeration processing is executed; and
   the means for executing an operation of interrupting communication executes an operation of interrupting communication voluntarily according to a measuring result of the means for counting the number of happenings.

4. The USB communication system according to claim 1:
   wherein the USB device includes a means for recognizing a voltage level of a power supply line in the USB cable; and
   the means for executing an operation of interrupting communication executes an operation of interrupting communication voluntarily according to a recognition result of the means for recognizing a voltage level.

5. The USB communication system according to claim 1:
   wherein the controlling means externally ejects a card medium remaining internally as a result of execution of operation of the interrupting communication.

6. The USB communication system according to claim 1:
   wherein the controlling means blocks further card medium reception as a result of execution of operation of the interrupting communication.

7. The USB communication system according to claim 1:
   wherein the controlling means locks and holds a card medium remaining internally as a result of execution of operation of the interrupting communication.

8. A USB device to be used in the USB communication system according to claim 1.

9. A method of error detection for a USB communication system, constructed by connecting a host apparatus and a USB device with a USB cable wherein the USB device is a card medium processing apparatus for executing a certain processing on a card medium, the method comprising:
   detecting a bus reset generated in the USB device at the time when a logical connection status is reset with the host apparatus;
   measuring a time from bus reset assertion to bus reset deassertion; and
   executing an operation of interrupting communication voluntarily according to a measuring result of the measuring a time from bus reset assertion to bus reset deassertion;
   wherein the executing an operation of interrupting communication voluntarily comprises mechanically controlling internal reception and external ejection of the card medium.

10. The method of error detection for a USB communication system according to claim 9 further comprising:
    a fourth step of executing enumeration processing in the USB device for setting a status of logical connection with the host apparatus after execution of the first step;
    a fifth step of measuring a processing time in which the enumeration processing is executed; and
    a sixth step of executing an operation of interrupting communication voluntarily according to a measuring result of the fifth step.

11. The method of error detection for a USB communication system according to claim 9 further comprising:
    a seventh step of counting the number of happenings of the bus reset in the USB device while the enumeration processing is executed; and
    an eighth step of executing an operation of interrupting communication voluntarily according to a measuring result of the seventh step.

12. The method of error detection for a USB communication system according to claim 9 further comprising:
    a ninth step of recognizing a voltage level of a power supply line in the USB cable in the USB device; and
    a tenth step of executing an operation of interrupting communication voluntarily according to a recognition result of the ninth step.

* * * * *